US012125470B2

(12) United States Patent
Shirai et al.

(10) Patent No.: US 12,125,470 B2
(45) Date of Patent: Oct. 22, 2024

(54) VOICE OUTPUT METHOD, VOICE OUTPUT SYSTEM AND PROGRAM

(71) Applicant: NIPPON TELEGRAPH AND TELEPHONE CORPORATION, Tokyo (JP)

(72) Inventors: Yoshinari Shirai, Tokyo (JP); Sanae Fujita, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 435 days.

(21) Appl. No.: 17/440,156

(22) PCT Filed: Mar. 9, 2020

(86) PCT No.: PCT/JP2020/010032
§ 371 (c)(1),
(2) Date: Sep. 16, 2021

(87) PCT Pub. No.: WO2020/189376
PCT Pub. Date: Sep. 24, 2020

(65) Prior Publication Data

US 2022/0148563 A1 May 12, 2022

(30) Foreign Application Priority Data

Mar. 18, 2019 (JP) ................................ 2019-050337

(51) Int. Cl.
*G10L 13/08* (2013.01)
*G10L 13/033* (2013.01)
*G10L 13/04* (2013.01)

(52) U.S. Cl.
CPC ............ *G10L 13/08* (2013.01); *G10L 13/033* (2013.01); *G10L 13/04* (2013.01)

(58) Field of Classification Search
None
See application file for complete search history.

(56) References Cited

U.S. PATENT DOCUMENTS

2007/0042332 A1* 2/2007 Leem ................. G06F 16/9535 434/156
2013/0144625 A1* 6/2013 Kurzweil ............... G10L 13/08 704/260

(Continued)

OTHER PUBLICATIONS

"Blue sky clerk" (2019) literature [online] accessed on Feb. 1, 2019 (Reading Day) website: https://sites.google.com/site/aozorashisho/.

(Continued)

*Primary Examiner* — Antim G Shah

(57) ABSTRACT

A speech output method carried out by a speech output system that includes a first terminal, a server, and a second terminal, wherein the first terminal carries out: a first label assignment step of assigning label data to character strings that are included in content, the label data representing attributes of speakers in a case where the character strings are to be read aloud by using synthetic speech; and a transmission step of transmitting the label data to the server, the server carries out a saving step of saving the label data transmitted from the first terminal, in a database, in association with content identification information that identifies the content, and the second terminal carries out: an acquisition step of acquiring label data that corresponds to the content identification information regarding the content, from the server.

20 Claims, 11 Drawing Sheets

(56) References Cited

U.S. PATENT DOCUMENTS

| | | | | |
|---|---|---|---|---|
| 2015/0356967 | A1* | 12/2015 | Byron | G10L 25/51<br>704/260 |
| 2017/0110110 | A1* | 4/2017 | Pollet | G10L 13/047 |
| 2019/0043474 | A1* | 2/2019 | Kingsbury | G06F 40/117 |

OTHER PUBLICATIONS

He et al. (2013) "Identification of Speakers in Novels" Proceedings of the 51st Annual Meeting of the Association for Computational Linguistics, Aug. 4, 2013, pp. 1312-1320.

* cited by examiner

Fig. 3

```
<voice gender="female" age="30" id="0">
    <voice gender = "male" age="20" id="1"> Having no particular destination in mind, I
    continued to walk along with Sensei. Sensei was less talkative than usual. I felt
    no acute embarrassment, however, and I strolled unconcernedly by his side.
    "Are you going straight home?" </voice>
    <voice gender="male" age="50" id="2"> "Yes. There is nothing else I particularly want to do now." </voice>
    Silently, they walked downhill towards the south.
    <voice id="1"> Again I broke the silence. "Is your family burial ground there?" I asked.
    </voice>
    <voice id="2"> "No." </voice>
    <voice id="1"> "Whose grave is it, then? Some relation of yours perhaps?" </voice>
    <voice id="2"> "No." </voice>
    <voice id="1"> Sensei would say no more about it. I decided to mention the matter no
    further. But after he had walked a hundred yards or so, Sensei suddenly reopened
    the conversation. </voice>
    <voice id="2"> "A friend of mine happens to be buried there." </voice>
</voice>
```

Fig. 7

SPEAKER TABLE

| SPEAKER_ID | SEX | AGE | NAME | COLOR | URL |
|---|---|---|---|---|---|
| 0 | F | 30 | default | blue | http://○○.○○/1.html |
| 1 | M | 20 | I | green | http://○○.○○/1.html |
| 2 | M | 50 | SENSEI | red | http://○○.○○/1.html |

SPEAKER DATA

SUBSTRING TABLE

| TEXT | POSITION | SPEAKER_ID | URL |
|---|---|---|---|
| Having no particular destination in mind, I continued to walk along with Sensei. Sensei was less talkative than usual. I felt no acute embarrassment, however, and I strolled unconcernedly by his side. "Are you going straight home?" | 0 | 1 | http://○○.○○/1.html |
| "Yes. There is nothing else I particularly want to do now." | 0 | 2 | http://○○.○○/1.html |
| Again I broke the silence. "Is your family burial ground there?" I asked. | 0 | 1 | http://○○.○○/1.html |
| "No." | 0 | 2 | http://○○.○○/1.html |
| "Whose grave is it, then? Some relation of yours perhaps?" | 0 | 1 | http://○○.○○/1.html |
| "No." | 1 | 2 | http://○○.○○/1.html |
| Sensei would say no more about it. I decided to mention the matter no further. But after he had walked a hundred yards or so, Sensei suddenly reopened the conversation. | 0 | 1 | http://○○.○○/1.html |
| "A friend of mine happens to be buried there." | 0 | 2 | http://○○.○○/1.html |

SUBSTRING DATA

VOICE OUTPUT METHOD, VOICE OUTPUT SYSTEM AND PROGRAM

CROSS-REFERENCE TO RELATED APPLICATIONS

This application is a U.S. 371 Application of International Patent Application No. PCT/JP2020/010032, filed on 9 Mar. 2020, which application claims priority to and the benefit of JP Application No. 2019-050337, filed on 18 Mar. 2019, the disclosures of which are hereby incorporated herein by reference in their entireties.

TECHNICAL FIELD

The present invention relates to a speech output method, a speech output system, and a program.

BACKGROUND ART

Conventionally, a technology called speech synthesis has been known. Speech synthesis has been used to, for example, convey information to a person with a visual disability, or convey information in a situation where a user cannot see a display enough (e.g. to convey information from a car navigation system to a user when the user is driving a car). In recent years, the performance of synthetic speech has improved so that it cannot be distinguished from human voice by just listening to it for a while, and speech synthesis is becoming widespread in combination with the spread of smartphones, smart speakers, and the likes.

Speech synthesis is typically used to convert text into synthetic speech. In such a case, speech synthesis is often referred to as text-to-speech (TTS) synthesis. Examples of effective use of text-to-speech synthesis include reading aloud an electronic book and reading aloud a Web page, using a smartphone or the like. For example, a smartphone application that uses synthetic voice to read aloud text on a digital library such as Aozora Bunko is known (NPL 1).

By using speech synthesis, not only for people with a visual disability, but also for non-disabled people, it is possible to have an E-book, a Web page, or the like read aloud with synthetic speech, even in a situation where it is difficult to operate a smartphone, such as in a crowded train or while driving. In addition, for example, when a person cannot be bothered to actively read characters, the person can passively obtain information by having the characters read aloud in a synthetic voice.

On the other hand, in order to help readers understand novels, research has been conducted to estimate the speakers of utterances in novels (NPL 2).

CITATION LIST

Non Patent Literature

[NPL 1] "Aozora Bunko", [online], <URL: https://sites-.google.com/site/aozorashisho/>

[NPL 2] He, et. al, "Identification of Speakers in Novels", Proceedings of the 51st Annual Meeting of the Association for Computational Linguistics, pages 1312-1320.

SUMMARY OF THE INVENTION

Technical Problem

When using speech synthesis to read aloud text, the voice of synthetic speech (hereinafter referred to as a "voice") is fixed to a voice that has been set in advance by the user on an OS (Operating System) or an application installed onto the smartphone. Therefore, for example, text may be read aloud in a voice different from the voice that the user imagined.

For example, when a novel is read aloud using speech synthesis in a state where the voice of an elderly man or the like is set, even the utterances of a character who is imagined as a young woman also have read aloud in the voice of an elderly man or the like.

To solve this problem, it is conceived of identifying the age and sex of the voice with which substrings in the content (an E-book, a Web page, or the like) is to be read aloud, and reading aloud text while switching between voices according to the result of identification for example. However, it is not easy to identify the subject (e.g. in the case of a conversational sentence, the attributes or the like of the speaker) of the substrings included in text. Also, even if the subject can be identified, there is no existing application for changing the voice of speech synthesis according to the result of identification and output the resulting voice.

The present invention has been made in view of the foregoing, and an object thereof is to output a speech according to attribute information assigned to content.

Means for Solving the Problem

To achieve the above-described object, an embodiment of the present invention provides a speech output method carried out by a speech output system that includes a first terminal, a server, and a second terminal, wherein the first terminal carries out: a first label assignment step of assigning label data to character strings that are included in content, the label data representing attributes of speakers in a case where the character strings are to be read aloud by using synthetic speech; and a transmission step of transmitting the label data to the server, the server carries out a saving step of saving the label data transmitted from the first terminal, in a database, in association with content identification information that identifies the content, and the second terminal carries out: an acquisition step of acquiring label data that corresponds to the content identification information regarding the content, from the server; a second label assignment step of assigning the acquired label data to the character strings included in the content; a specification step of, by using pieces of label data that are respectively assigned to the character strings included in the content, specifying, for each of the character strings, a piece of speech data for synthetic speech to be used to read aloud the character string, from among a plurality of pieces of speech data; and a speech output step of outputting speech by reading aloud each of the character strings included in the content by using synthetic speech with the specified piece of speech data.

Effects of the Invention

It is possible to output a speech according to attribute information assigned to content.

BRIEF DESCRIPTION OF DRAWINGS

FIG. 3 is a diagram illustrating an example in which label assignment is realized using tags in an XML format.

FIG. 7 is a diagram showing an example of a structure of label data stored in a label management DB.

DESCRIPTION OF EMBODIMENTS

The following describes an embodiment of the present invention. An embodiment of the present invention describes a speech output system 1. The speech output system 1 assigns labels to substrings included in content by using a human computing technology, and thereafter outputs synthetic voices while switching between the voices according to the labels assigned to the substrings. As a result, with the speech output system 1 according to an embodiment of the present invention, it is possible to output speech based on the substrings included in the content, with voices that are similar to the voices that the user imagined.

Here, labels are information representing identification information regarding the speaker who reads aloud the substrings (e.g. the name of the speaker) and the attributes (e.g. the age and sex) of the speaker when the substrings included in the content is read aloud using speech synthesis. Also, content is electronic data represented by text (i.e. strings). Examples of content include a Web page and an E-book. In an embodiment of the present invention, content is text on a Web page (e.g. a novel or the like published on a web page).

Furthermore, the human computation technology is, generally, a technology for solving problems that are difficult for computers to solve, by using human processing power. In an embodiment of the present invention, the assignment of labels to substrings in content is realized by using the human computation technology (i.e. labels are manually assigned to the substrings by using a UI (user interface) such as a labeling screen described below).

In the embodiment of the present invention, it is assumed that a plurality of substrings to be read aloud with different voices are included in content, the present invention is not limited to such an example. The embodiment of the present invention is applicable to a case where, for example, all the strings in a single set of content are to be read aloud with one voice. (Note that "the substrings in the content" in this case mean all the strings.)

<Content and Voice Assignment>

First, the assignment of voices to the substrings in the content to be read aloud using speech synthesis will be described.

Figure 1:
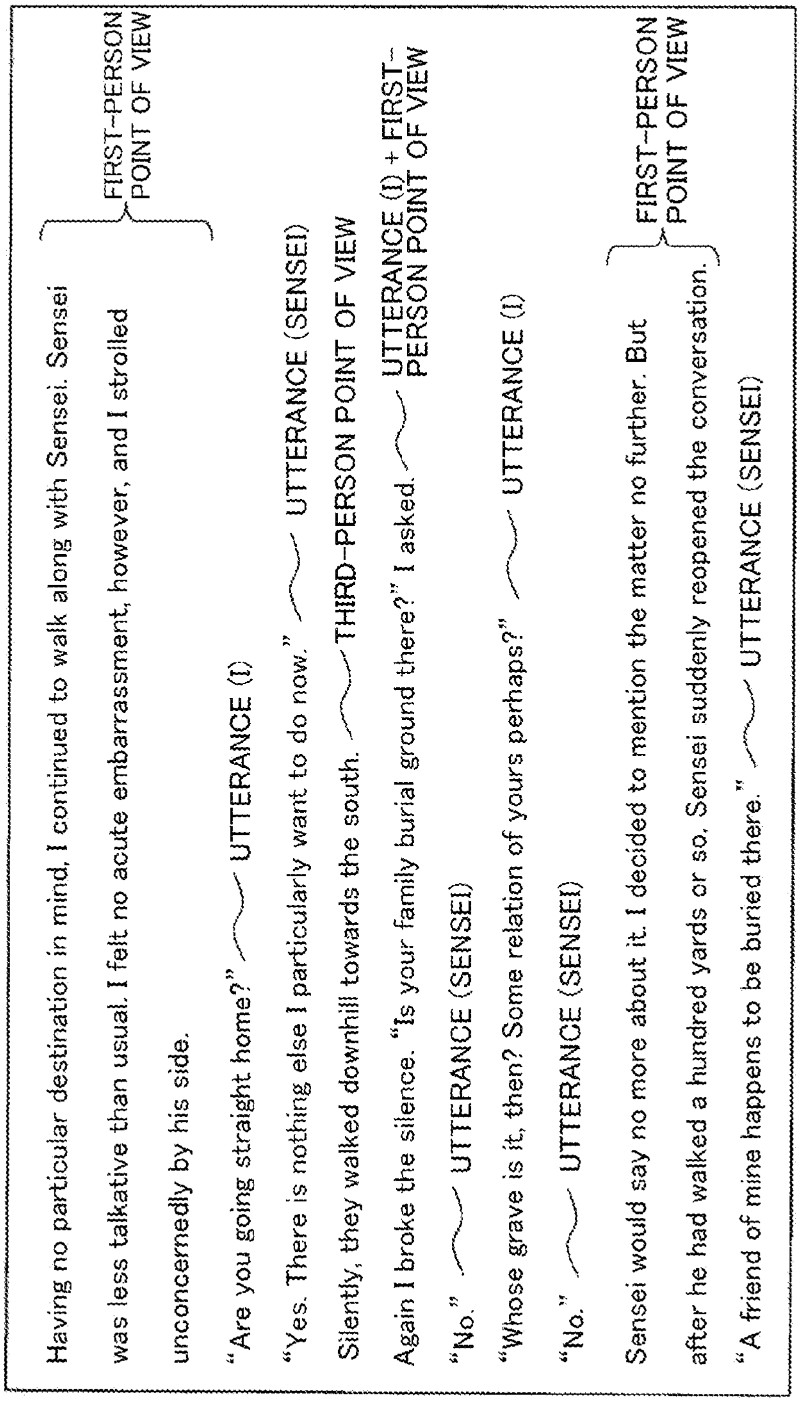
FIG. 1 is a diagram for illustrating an example of content that is to be read aloud.

FIG. 1 shows an example of the content to be read aloud. FIG. 1 shows an excerpt from "Kokoro", a novel written by Soseki Natsume, as an example of content. Content like a novel includes sentences described from a first-person point of view, sentences described from a third-person point of view, sentences representing utterances of a certain character, and the like.

For example, in the example in FIG. 1, "Having no particular destination in mind, I continued to walk along with Sensei. Sensei was less talkative than usual. I felt no acute embarrassment, however, and I strolled unconcernedly by his side." are sentences written from a first-person point of view. "'Are you going straight home?'" is a sentence representing an utterance of the character "I". Similarly, "'Yes. There is nothing else I particularly want to do now'" are sentences representing utterances of the character "Sensei". "Silently, they walked downhill towards the south." is a sentence written from a third-person point of view. Regarding the sentences "Again I broke the silence. 'Is your family burial ground there?' I asked.", the sentence between the quotation marks (' ') represents an utterance of the character "I", and the subsequent sentence is written from the first-person point of view.

When the content shown in FIG. 1 is read aloud using speech synthesis, it is preferable that the voice with which the utterances of the character "I" are read aloud and the voice with which the utterances of the character "Sensei" are read aloud are different, and that each voice is invariable.

In addition, it is preferable that, if sentences other than the utterances (i.e. sentences between quotation marks) are from a third-person point of view, they are read aloud in a voice different from the voices used for utterances of the characters. On the other hand, it is preferable that, if such sentences are from a first-person point of view, they are read aloud with the same voice as the voice of the corresponding character ("I" in the example shown in FIG. 1).

Figure 2:
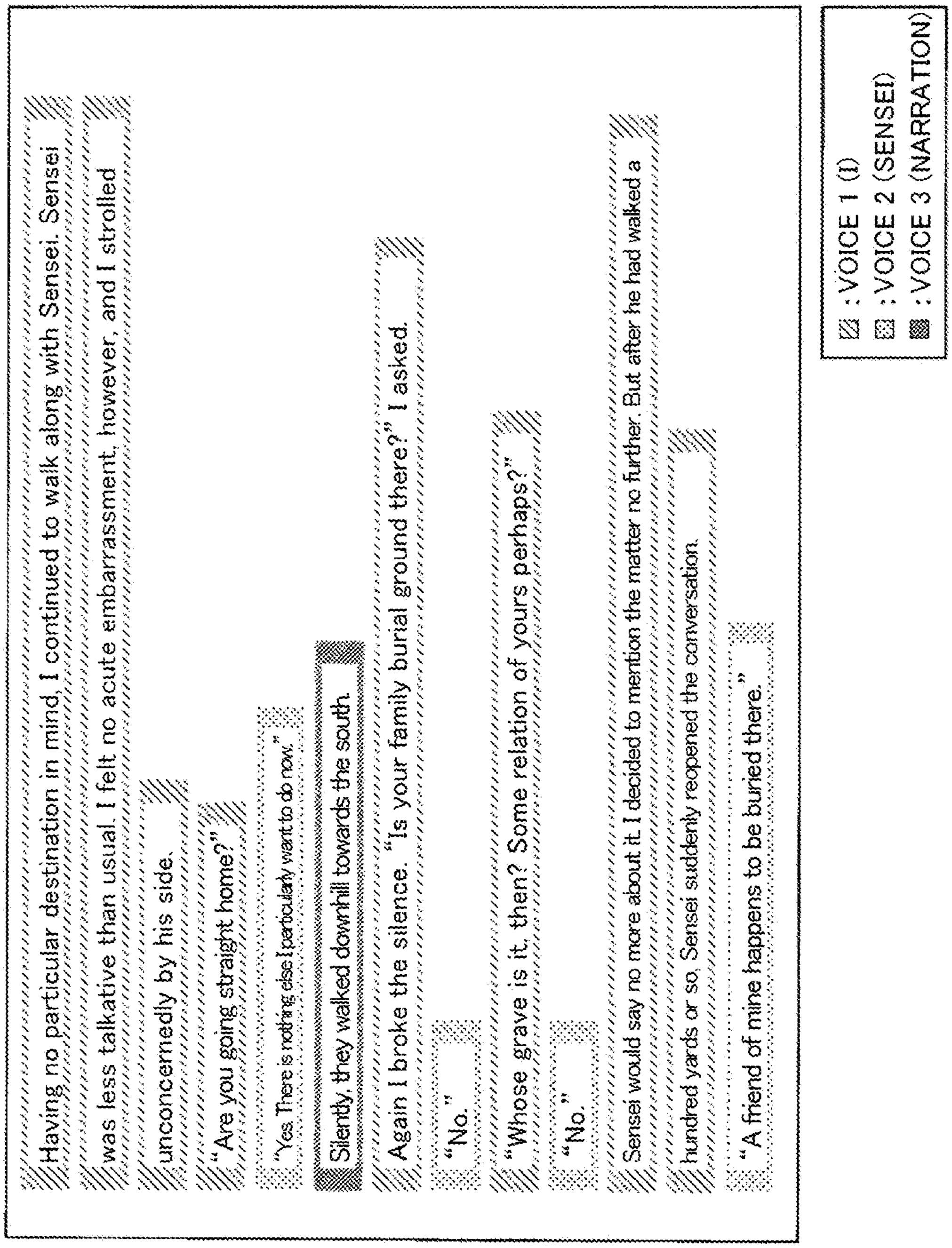
FIG. 2 is a diagram for illustrating an example of voice assignment.

As described above, when the content shown in FIG. 1 is read aloud using voice synthesis, it is preferable to use a voice 1 representing the character "I", a voice 2 representing the character "Sensei", and a voice 3 representing the narration for reading aloud sentences from the third-person point of view as shown in FIG. 2, for example, and assign, to each substring in the content, the voice corresponding thereto, and read aloud the substring in the voice.

In other words, in content like a novel, it is generally preferable to assign the same voice to the utterances of the same character, and invariably read them aloud in the voice, and to assign a voice corresponding to the third-person point of view, the first-person point of view, or the like to narrative sentences (sentences other than utterances), and invariably read them aloud in the voice.

In the example shown in FIG. 1, a novel is given as an example of content. However, as a matter of course, the present invention is not limited to such an example. Content need not have to be a novel such as an E-book, and may be an editorial, a thesis, a comic book, or the like, or a Web page such as a news site.

In particular, in the case of a news site Web page, for example, some users may want it to be read aloud like a male news anchor does, while others may want it to be read aloud like a female news anchor does. Also, user may want a politician's comment or the like appearing in an article on a news site, for example, to be read aloud in a voice corresponding to the politician's sex and age. Also, regarding a thesis or the like, if the narrative is read aloud in the voice corresponding to the sex and age of the first author, and quoted parts and the like are read aloud in another voice, the use of the content of the thesis may be promoted. The embodiment of the present invention is also applicable to these cases.

<Assignment of Labels to Substrings>

The following descries a method for assigning labels to substrings in content to realize the above-descried reading aloud.

For example, if labels shown in FIG. 3 (i.t. tags in the XML format) are assigned to the substrings in the content of a Web page, it is possible to realize voice assignment as shown in FIG. 2. This is because, if such labels are assigned to substrings, an application program that uses synthetic speech to read aloud the substrings can select, for each sentence (substring) surrounded by tags, a voice that is close to the age and the sex (gender) indicated by attribute values regarding age and sex, to read it aloud in the voice. In addition, it is possible to perform management regarding whether or not utterances are of the same character, using id (identification information), and to read aloud utterances to which the same id is assigned in the same voice, invariably.

In the example shown in FIG. 3, labels similar to those of SSML (Speech Synthesis Markup Language) are used. However, as described in Reference Document 1 below, for example, it is also possible to use the existing labels related to the annotation of speaker's information to utterances.

[Reference Document 1]

Yumi MIYAZAKI, Wakako KASHINO, Makoto YAMAZAKI, "Fundamental Planning of Annotation of Speaker's Information to Utterances: Focused on Novels in "Balanced Corpus of Contemporary Written Japanese", Proceedings of Language Resources Workshop, 2017.

However, as described above, when labels are to be embedded in content, only a person with authority to update the content (e.g. the creator or the like of the content) can assign or update the labels. For example, for content creators who create and publish content such as a novel on a Web page, it may be troublesome to assign or update labels by themselves. Also, content creators do not necessarily have a strong motivation to have the content of a Web page read aloud in a plurality of voices.

Therefore, in the embodiment of the present invention, a third party other than the content creator (e.g. a user or the like of the content) assigns labels to the content of the Web page by using the human computation technology. In the embodiment of the present invention, a third party who assigns labels (such a third party is also referred to as a "labeler") assigns labels to substrings in the content by setting, for each substring in the content, the identification information, sex, and age of the speaker who is to read aloud the substring. As a result, it is possible to read aloud each substring in the content in a voice corresponding to the label assigned to the substring. A specific method for label assignment will be described later.

<Overall Configuration of Speech Output System 1>

Figure 4:
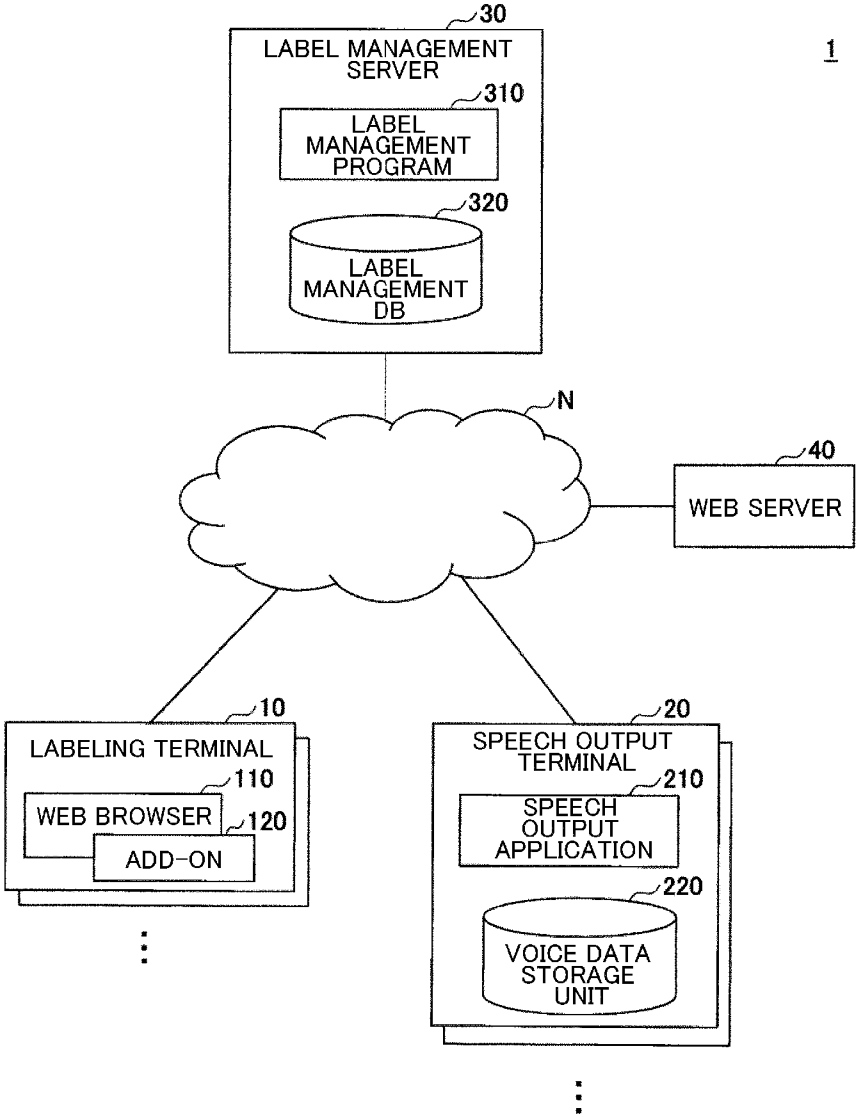
FIG. 4 is a diagram showing an example of an overall configuration of a speech output system according to an embodiment of the present invention.

Next, an overall configuration of the speech output system 1 according to the embodiment of the present invention will be described with reference to FIG. 4. FIG. 4 is a diagram showing an example of an overall configuration of the speech output system 1 according to the embodiment of the present invention.

As shown in FIG. 4, the speech output system 1 according to the embodiment of the present invention includes at least one labeling terminal 10, at least one speech output terminal 20, a label management server 30, and a Web server 40. These terminals and servers are communicably connected to each other via a communication network N such as the Internet.

The labeling terminal 10 is a computer that is used to assign labels to substrings in content. For example, a PC (personal computer), a smartphone, a tablet terminal, or the like maybe used as the labeling terminal 10.

The labeling terminal 10 is equipped with a Web browser 110 and an add-on 120 for the Web browser 110. Note that the add-on 120 is a program that provides the Web browser 110 with extensions. An add-on may also be referred to as an add-in.

The labeling terminal 10 can display content by using the Web browser 110. Also, the labeling terminal 10 can assign labels to substrings in the content displayed on the Web browser 110, using the add-on 120. At this time, a labeling screen that is used to assign labels to the substrings in the content is displayed on the labeling terminal 10 by the add-on 120. The labeler can assign labels to the substrings in the content on this labeling screen. The labeling screen will be described later.

Using the add-on 120, the labeling terminal 10 transmits data representing the labels assigned to the substrings (hereinafter also referred to as "label data") to the label management server 30.

The speech output terminal 20 is a computer used by a user who wishes to have content read aloud using speech synthesis. For example, a PC, a smartphone, a tablet terminal, or the like maybe used as the speech output terminal 20. In addition, for example, a gaming device, a digital home appliance, an on-board device such as a car navigation terminal, a wearable device, a smart speaker, or the like may be used.

The speech output terminal 20 includes a speech output application 210 and a voice data storage unit 220. The speech output terminal 20 uses the speech output application 210 to acquire label data regarding labels assigned to substrings included in content, from the label management server 30. The speech output terminal 20 uses voice data that is stored in the voice data storage unit 220, to output speech that is read aloud in a voice corresponding to a label assigned to a substring in the content.

The label management server 30 is a computer for managing label data. The label management server 30 includes a label management program 310 and a label management DB 320. The label management server 30 uses the label management program 310 to store label data transmitted from the labeling terminal 10, in the label management DB 320. Also, the label management server 30 uses the label management program 310 to transmit label data stored in the label management DB 320 to the speech output terminal 20, in response to a request from the speech output terminal 20.

The Web server 40 is a computer for managing content. The Web server 40 manages content created by a content creator. In response to a request from the labeling terminal 10 or the speech output terminal 20, the Web server 40 transmits content related to this request to the labeling terminal 10 or the speech output terminal 20.

Note that the configuration of the speech output system 1 shown in FIG. 1 is an example, and another configuration may be employed. For example, the labeling terminal 10 and the speech output terminal 20 need not be separate terminals (i.e. a single terminal may have the functions of the labeling terminal 10 and the functions of the speech output terminal 20).

<Labeling Screen>

Figure 5:
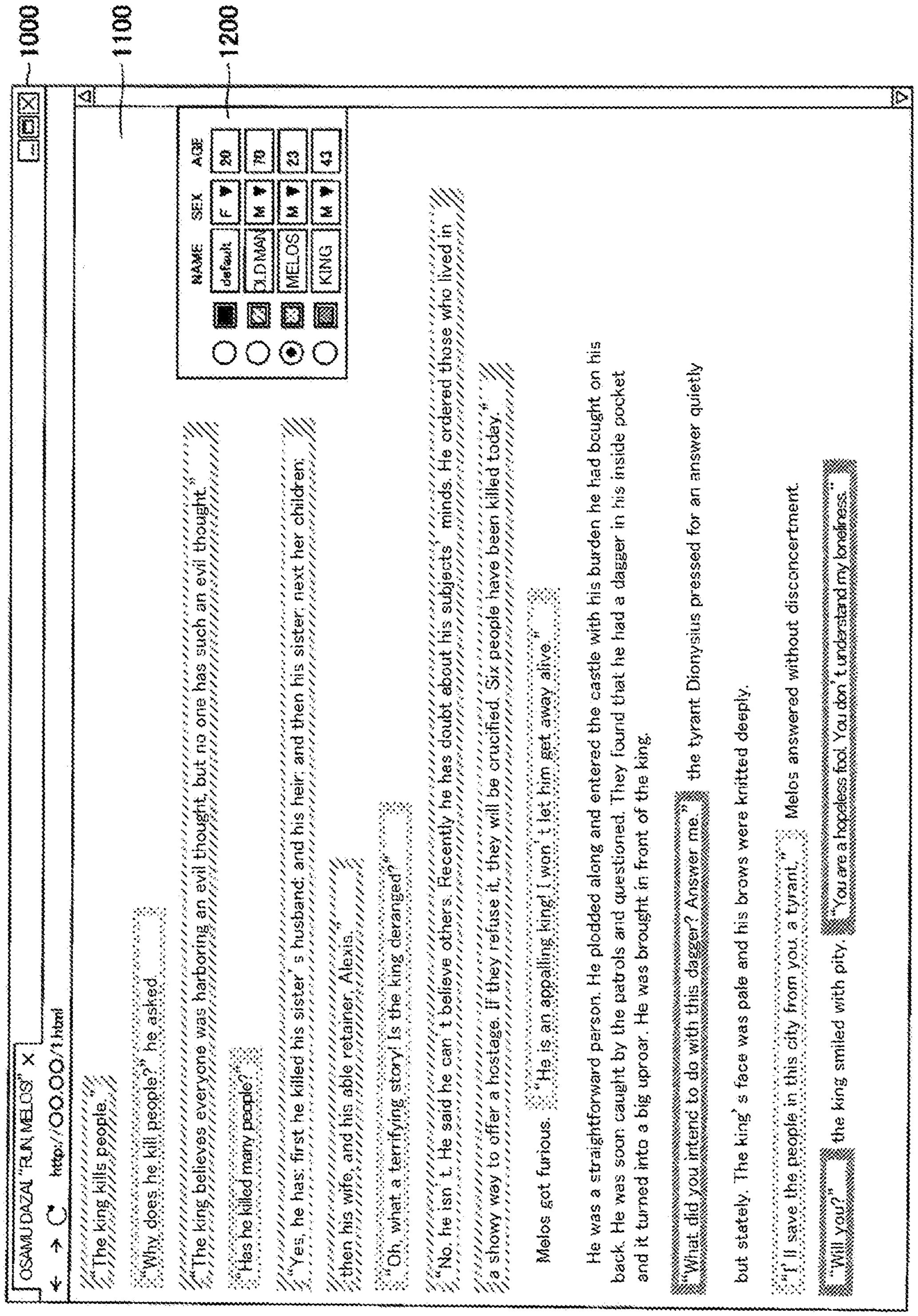
FIG. 5 is a diagram showing an example of a labeling screen.

A labeling screen 1000 to be displayed on the labeling terminal 10 is shown in FIG. 5. FIG. 5 is a diagram showing an example of the labeling screen 1000. The labeling screen 1000 shown in FIG. 5 is to be displayed by the Web browser 110 or the add-on 120 (or both of them) provided in the labeling terminal 10.

The labeling screen 1000 includes a content display field 1100 and a labeling window 1200. The content display field 1100 is a display field for displaying content and labeling results. The labeling window 1200 is a dialog window used to assign labels to substrings included in the content displayed in the content display field 1100.

The labeling window 1200 displays a list of speakers, in which a name, a sex, and an age are set to each speaker, and each speaker is selectable by using a radio button. Here, each speaker in the list corresponds to a label, the name corresponds to identification information, and the sex and age correspond to attributes.

In the example shown in FIG. 5, a speaker with the name "default", the sex "F", and the age "20", a speaker with the name "old man", the sex "M", and the age "70", a speaker with the name "Melos", the sex "M", and the age "23", and a speaker with the name "king", the sex M, and the age "43" are displayed in a list.

The labeling window 1200 includes an ADD button, a DEL button, a SAVE button, and a LOAD button. Upon the labeler pressing the ADD button, one speaker is added to the list. Upon the DEL button being pressed, the speaker selected with a radio button is removed from the list. Upon the SAVE button being pressed, the label data regarding the label assigned to a substring included in the content is transmitted to the label management server 30. On the other hand, upon the LOAD button being pressed, the label data managed by the label management server 30 is acquired, and the current labeling state of the content is displayed.

When a label is to be assigned to a substring included in the content displayed in the content display field 1100, the labeler selects a desired speaker in the labeling window 1200, and selects a desired substring, using a mouse or the like. As a result, a label representing the selected speaker and the attributes (the age and sex) thereof are assigned to the selected substring. At this time, the substring to which the label is assigned is marked with a color that is unique to the speaker represented by the assigned label, or is displayed in a display mode that is specified to the speaker, and thus the labeling state is visualized.

In the example shown in FIG. 5, a label representing the speaker "old man" and the attributes thereof (the sex "M" and the age "70") is assigned to the substring "'The king kills people.'" in the content displayed in the content display field 1100. Similarly, in the example shown in FIG. 5, a label representing the speaker "Melos" and the attributes thereof (the sex "M" and the age "23") is assigned to the substring "'Why does he kill people?'".

Note that the label assigned to the speaker with the name "default" is a label assigned to substrings other than the substrings to which labels are explicitly assigned by the labeler. In the example shown in FIG. 5, the label representing the speaker with the name "default" is assigned to substrings to which a label representing the name "old man", the name "Melos", or the name "king" is not assigned.

As described above, the labeler can assign labels to the substrings in the content, on the labeling screen 1000. Thus, as described below, the speech output application 210 of the speech output terminal 20 can read aloud each substring in the voice corresponding to the label assigned to the substring, and output speech (in other words, a label is assigned to each substring, and accordingly the voice corresponding to the label is assigned to the substring).

<Functional Configuration of Speech Output System 1>

Figure 6:
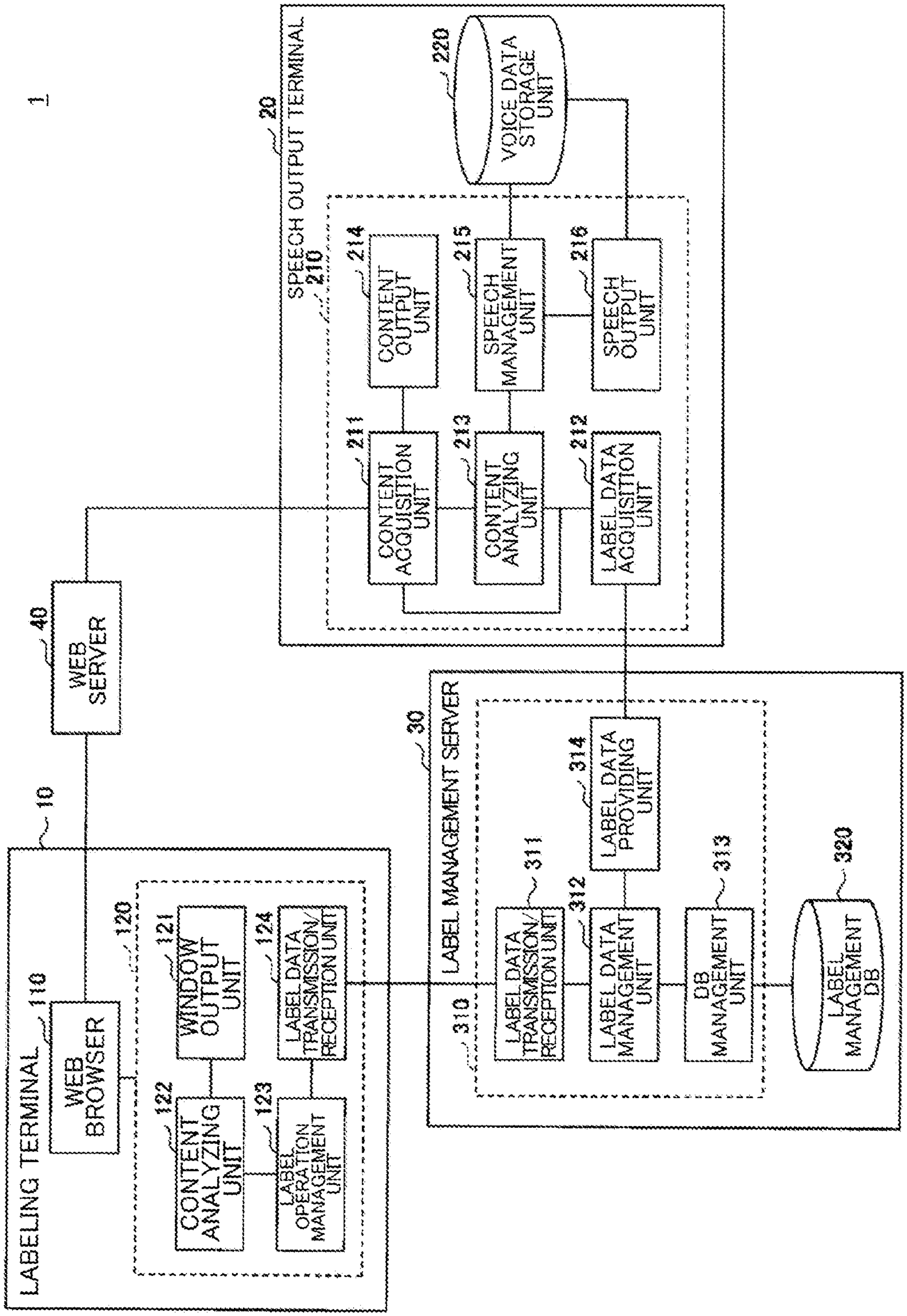
FIG. 6 is a diagram showing an example of a functional configuration of a speech output system according to an embodiment of the present invention.

Next, a functional configuration of the speech output system 1 according to the embodiment of the present invention will be described with reference to FIG. 6. FIG. 6 is a diagram showing an example of a functional configuration of the speech output system 1 according to the embodiment of the present invention.

<<Labeling Terminal 10>>

As shown in FIG. 6, the labeling terminal 10 according to the embodiment of the present invention includes a window output unit 121, a content analyzing unit 122, a label operation management unit 123, and a label data transmission/reception unit 124 as functional units. These functional units are realized through processing that the add-on 120 causes a processor or the like to execute.

The window output unit 121 displays the above-described labeling window on the Web browser 110.

The content analyzing unit 122 analyzes the structure of content (e.g. a Web page) displayed by the Web browser 110. Here, examples of the structure of content include a DOM (Document Object Model).

The label operation management unit 123 manages operations related to the assignment of labels to the substrings included in content. For example, the label operation management unit 123 accepts an operation performed to select a speaker from the list in the labeling window by using a radio button, an operation performed to select a substring in the content by using the mouse, and so on.

The label operation management unit 123 acquires an HTML (HyperText Markup Language) element to which the substring selected with the mouse belongs, and performs processing to visualize the labeling state thereof (i.e. processing performed to mark the HTML element with the color unique to the label), for example, based on the results of analysis performed by the content analyzing unit 122.

The label data transmission/reception unit 124, upon the SAVE button being pressed in the labeling window, transmits the label data regarding the labels assigned to the substrings in the current content, to the label management server 30. At this time, the label data transmission/reception unit 124 also transmits the URL (Uniform Resource Locator) of the labeled content to the label management server 30. Note that, at this time, the label data transmission/reception unit 124 may transmit information regarding the labeler who has performed the labeling (e.g. the user ID or the like of the labeler), to the label management server 30 when necessary.

Upon the LOAD button being pressed in the labeling window, the label data transmission/reception unit 124 receives label data that is under the management of the label management server 30. As a result, in a case where the labeler transmits label data to the label management server 30 halfway through the labeling of given content, for example, the labeler can resume the labeling.

<<Speech Output Terminal 20>>

As shown in FIG. 6, the speech output terminal 20 according to the embodiment of the present invention includes a content acquisition unit 211, a label data acquisition unit 212, a content analyzing unit 213, a content output unit 214, a speech management unit 215, and a speech output unit 216 as functional units. These functional units are realized through processing that the speech output application 210 causes a processor or the like to execute.

The speech output terminal 20 according to the embodiment of the present invention includes the voice data storage unit 220 as a storage unit. The storage unit can be realized by using a storage device or the like provided in the speech output terminal 20.

The content acquisition unit 211 acquires content (e.g. a Web page on which text of a novel or the like is published) from the Web server 40.

The label data acquisition unit 212 acquires the label data corresponding to the URL of the content (i.e. the identification information of the content) acquired by the content acquisition unit 211, from the label management server 30. The label data acquisition unit 212 transmits an acquisition request that includes the URL of the content, for example, to the label management server 30, and can thereby acquire label data as a response to the acquisition request.

The content analyzing unit 213 analyzes the content acquired by the content acquisition unit 211, and specifies which piece of label data is assigned to which substring of the text included in the content.

The content output unit 214 displays the content acquired by the content acquisition unit 211. However, the content output unit 214 need not necessarily have to display content. If content is not to be displayed, the speech output terminal 20 need not have to include the content output unit 214.

The speech management unit 215 specifies, for each substring in the content, which piece of voice data stored in the voice data storage unit 220 is to be used to read aloud the substring, based on the results of analysis performed by the content analyzing unit 213. That is to say, by using the attributes represented by the labels respectively assigned to the substrings, the speech management unit 215 searches for, for each substring, the piece of voice data that has attributes closest to the attributes of the substring, from the pieces of voice data stored in the voice data storage unit 220, and specifies the found voice data as the voice data to be used to read aloud the substring. Thus, voices are assigned to the substrings in the content.

The speech output unit 216 reads aloud each substring in the content by using synthetic speech with the voice data corresponding thereto, and thus outputs speech. At this time, the speech output unit 216 reads aloud each substring and outputs speech by using the voice data specified by the speech management unit 215. Note that the user of the speech output terminal 20 may be allowed to perform operations regarding the synthetic speech, such as output start (i.e. playback), pause, fast forward (or playback from the next substring), and rewind (or playback from the previous substring). If this is the case, the speech output unit 216 controls the output of speech performed using voice data, in response to such an operation.

The voice data storage unit 220 stores voice data that is to be used to read aloud the substrings in the content. Here, the voice data storage unit 220 stores a set of attributes (e.g. the sex and the age) in association with each piece of voice data. Note that any kind of vice data may be used as such pieces of voice data, and may be downloaded in advance from a given server or the like. However, if attributes are not assigned to the downloaded voice data, the user of the speech output terminal 20 needs to assign attributes to the voice data.

<<Label Management Server 30>>

As shown in FIG. 6, the label management server 30 according to the embodiment of the present invention includes a label data transmission/reception unit 311, a label data management unit 312, a DB management unit 313, and a label data providing unit 314 as functional units. These functional units are realized through processing that the label management program 310 causes a processor or the like to execute.

The label management server 30 according to the embodiment of the present invention includes the label management DB 320 as a storage unit. The storage unit can be realized by using a storage device provided in the label management server 30, a storage device connected to the label management server 30 via the communication network N, or the like.

The label data transmission/reception unit 311 receives label data from the labeling terminal 10. Also, the label data transmission/reception unit 311 transmits label data to the labeling terminal 10.

Upon label data being received by the label data transmission/reception unit 311, the label data management unit 312 verifies the label data. The verification of label data is, for example, verification regarding whether or not the format (data format) of the label data is correct.

The DB management unit 313 stores the label data verified by the label data management unit 312, in the label management DB 320.

Note that, if label data that represents a different label for the same substring is already stored in the label management DB 320, the DB management unit 313 may update the old label data with new label data, or allow both the old label data and the new label data to coexist. Also, pieces of label data for the same substring may be regarded as different pieces of label data if the user ID of the labeler is different for each.

In response to an acquisition request from the speech output terminal 20, the label data providing unit 314 acquires the label data corresponding thereto (i.e. the label data corresponding to the URL included in the acquisition request) from the label management DB 320, and transmits the acquired label data to the speech output terminal 20 as a response to the acquisition request.

The label management DB 320 stores label data. As described above, label data is data representing labels assigned to the substrings included in content. Each label represents the identification information and attributes of a speaker who reads aloud the substring corresponding thereto. Therefore, in label data, it is only necessary that at least content, information that can specify each substring in the content, the identification information of the speaker who reads aloud the substring, and the attributes of the speaker are associated with each other.

Any data structure may be employed to store such label data in the label management DB 320. For example, FIG. 7 shows the label data in a case where a speaker table and a substring table are used to store the label data in the label management DB 320. FIG. 7 is a diagram showing an example of a configuration of a label data stored in the label management DB 320.

As shown in FIG. 7, the speaker table stores one or more pieces of speaker data, and each piece of speaker data includes "SPEAKER_ID", "SEX,", "AGE", "NAME", "COLOR", and "URL" as data items.

In the data item "SPEAKER_ID", an ID for identifying the piece of speaker data is set. In the data item "SEX", the sex of the speaker is set as an attribute of the speaker. In the data item "AGE", the age of the speaker is set as an attribute of the speaker. In the data item "NAME", the name of the speaker is set. In the data item "COLOR", a color that is unique to the speaker is set to visualize the labeling state. In the data item "URL", the URL of the content is set.

Note that, in the example shown in FIG. 7, the ID set in the data item "SPEAKER_ID" is used as the identification of the speaker, considering the case where the same name is set in the data item "NAME" of several pieces of speaker data. However, for example, if the same name cannot be set in the data item "NAME", the name of the speaker may be used as identification information.

As shown in FIG. 7, the substring table stores one or more pieces of substring data, and each piece of substring data includes "TEXT", POSITION", "SPEAKER_ID", and "URL" as data items.

In the data item "TEXT", a substring selected by the labeler is set. In the data item "POSITION", the number of times the substring has appeared in the content from the beginning. In the data item "SPEAKER_ID", the speaker selected by the labeler (i.e. the speaker selected in the labeling window" is set. In the data item "URL", the URL of the content is set.

For example, in the substring data included in the third line of the substring table shown in FIG. 7, "Again I broke the silence. 'Is your family burial ground there?' I asked." is set in the data item "TEXT", "0" is set in the data item "POSITION", and "1" is set in the data item "SPEAKER_ID". This means that the same substring as the substring "Again I broke the silence. 'Is your family burial ground there?' I asked." has not appeared in the content from the begging to the substring, and the substring is to be read aloud in the voice of the piece of speaker data whose SPEAKER_ID is "1" (i.e. the speaker whose name (NAME) is "I").

Similarly, in the substring data included in the sixth line of the substring table shown in FIG. 7, "'No.'" is set in the data item "TEXT", "1" is set in the data item "POSITION", and "2" is set in the data item "SPEAKER_ID". This means that the same substring as the substring "'No.'" has appeared once in the content from the begging to the substring, and the substring is to be read aloud in the voice of the piece of speaker data whose SPEAKER_ID is "2" (i.e. the speaker whose name (NAME) is "Sensei").

By providing each piece of substring data with the data item "POSITION", it is possible to search for a substring to which a label is assigned, by also using the number of times the substring has appeared in the content from the beginning, when the speech output application 210 is to read aloud the substrings in the content. Also, even when the Web page (content) has been updated, if the position of the substring relative to the beginning remains unchanged, the label assigned to the substring before the Web page has been updated can be used.

Here, a substring that is included in the content and is not stored in the substring table is to be read aloud in the voice of the piece of speaker data whose SPEAKER_ID is "0" (i.e. the piece of voice data in which "default" is set to the data item "NAME" thereof).

As described above, with the structure shown in FIG. 7, label data is represented by sets of speaker data and substring table, or only by speaker data. For example, label data regarding a label assigned to a substring that represents an utterance (a sentence between quotation marks) in the content or a substring that represents a sentence written from the first-person point of view is represented as a set of speaker data and substring data. On the other hand, label data regarding a label assigned to a substring that represents a sentence written from the third-person point of view in the content is represented as speech data in which "0" is set to the data item "SPEAKER_ID" thereof.

Note that the structure of the label data shown in FIG. 7 is an example, and another configuration may be employed. For example, it is possible to copy the source files of the web page (content), and embed labels in the copied source files, and hold them in a DB. However, if this is the case, when the Web page is updated, it may be difficult to associate the labels before and after the update with the substrings. Therefore, the structure shown in FIG. 7 described above is preferable.

<Label Assignment Processing>

Figure 8:
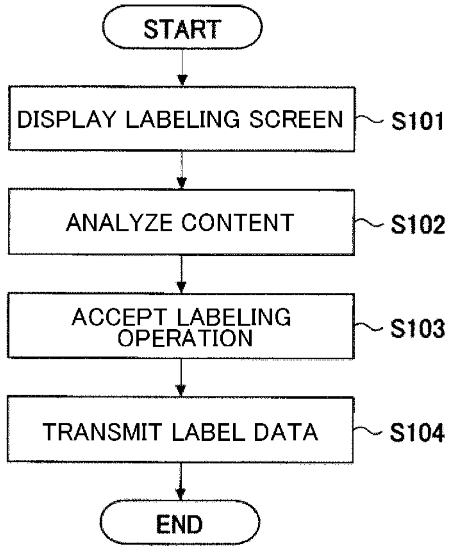
FIG. 8 is a flowchart showing an example of label assignment processing according to an embodiment of the present invention.

The following describes the flow of processing that is performed when the labeler assigns labels to the substrings in the content by using the labeling terminal 10 (label assignment processing) with reference to FIG. 8. FIG. 8 is a flowchart showing an example of label assignment processing according to the embodiment of the present invention.

First, the Web browser 110 and the window output unit 121 of the labeling terminal 10 displays the labeling screen (step S101) That is to say, the labeling terminal 10 acquires content by using the Web browser 110 and displays it on the screen, and also displays the labeling window on the same screen by using the window output unit 121, and thus displays the labeling screen.

Next, the content analyzing unit 122 of the labeling terminal 10 analyzes the structure of the content displayed by the Web browser 110 (step S102).

Next, the label operation management unit 123 of the labeling terminal 10 accepts a labeling operation performed by the labeler (step S103). The labeling operation is an operation performed to select a speaker from the list on the labeling window via a radio button, and thereafter select a substring in the content with a mouse. As a result, a label is assigned to the substring, and the labeling state is visualized by, for example, marking the substring with the color unique to the speaker.

Finally, upon the SAVE button in the labeling window being pressed, for example, the label data transmission/reception unit 124 of the labeling terminal 10 transmits label data regarding the label assigned to the substring in the current content to the label management server 30 (step S104). At this time, as described above, the label data transmission/reception unit 124 also transmits the URL of the labeled content to the label management server 30.

Through such processing, a label is assigned to a substring in the content by the labeler, and label data regarding this label is transmitted to the label management server 30.

<Label Data Saving Processing>

Figure 9:
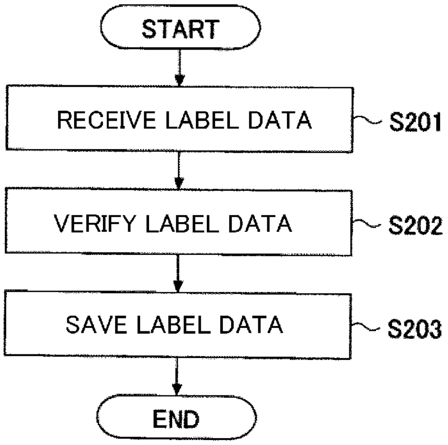
FIG. 9 is a flowchart showing an example of label data saving processing according to an embodiment of the present invention.

The following describes the flow of processing that is performed by the label management server 30 to save the label data transmitted from the labeling terminal 10 (label data saving processing) with reference to FIG. 9. FIG. 9 is a flowchart showing an example of label data saving processing according to the embodiment of the present invention.

First, the label data transmission/reception unit 311 of the label management server 30 receives label data from the labeling terminal 10 (step S201).

Next, the label data management unit 312 of the label management server 30 verifies the label data received in the above step S201 (step S202).

Next, if the verification in the above step S202 is successful, the DB management unit 313 of the label management server 30 saves the label data in the label management DB 320 (step S203).

Through such processing, label data regarding the label assigned to the substring in the content by the labeler is saved in the label management server 30.

<Speech Output Processing>

Figure 10:
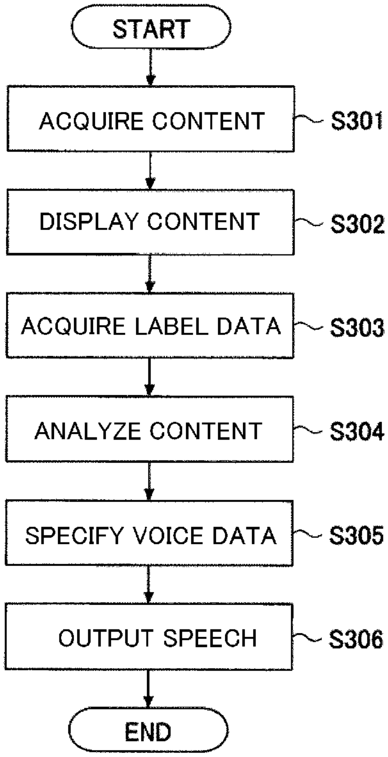
FIG. 10 is a flowchart showing an example of speech output processing according to an embodiment of the present invention.

The following describes the flow of processing that is performed by using the speech output terminal 20 to read aloud a substring in the content in the voice corresponding to the label assigned to the substring (speech output processing) with reference to FIG. 10. FIG. 10 is a flowchart showing an example of speech output processing according to the embodiment of the present invention.

First, the content acquisition unit 211 of the speech output terminal 20 acquires content from the Web server 40 (step S301).

Next, the content output unit 214 of the speech output terminal 20 displays the content acquired in the above step S301 (step S302).

Next, the label data acquisition unit 212 of the speech output terminal 20 acquires the label data corresponding to the URL of the content acquired in the above step S301, from the label management server 30 (step S303).

Next, the content analyzing unit 213 of the speech output terminal 20 analyzes the content acquired in the above step S301 (step S304). As described above, through this analysis, which piece of label data is assigned to which substring of the text included in the content is specified.

Next, the speech management unit 215 of the speech output terminal 20 specifies, for each substring in the content, the piece of voice data to be used to read aloud the substring, from the voice data storage unit 220, based on the results of analysis in the above step S304 (step S305). That is to say, as described above, by using the attributes represented by the labels respectively assigned to the substrings, the speech management unit 215 searches for, for each substring, the piece of voice data that has attributes closest to the attributes of the substring, from the pieces of voice data stored in the voice data storage unit 220, and specifies the found voice data as the voice data to be used to read aloud the substring. At this time, the same piece of voice data is specified for substrings to which label data with the same speaker identification information (e.g. SPEAKER_ID) is assigned. As a result, voices are assigned to the substrings in the content with consistency.

Finally, the speech output unit 216 of the speech output terminal 20 reads aloud each substring, in the voice assigned thereto in the above step S305 (using synthetic speech in the voice) to output speech (step S306).

Through such processing, each substring in the content is read aloud in the voice corresponding to the label assigned to the substring.

<Hardware Structure of Speech Output System 1>

Figure 11:
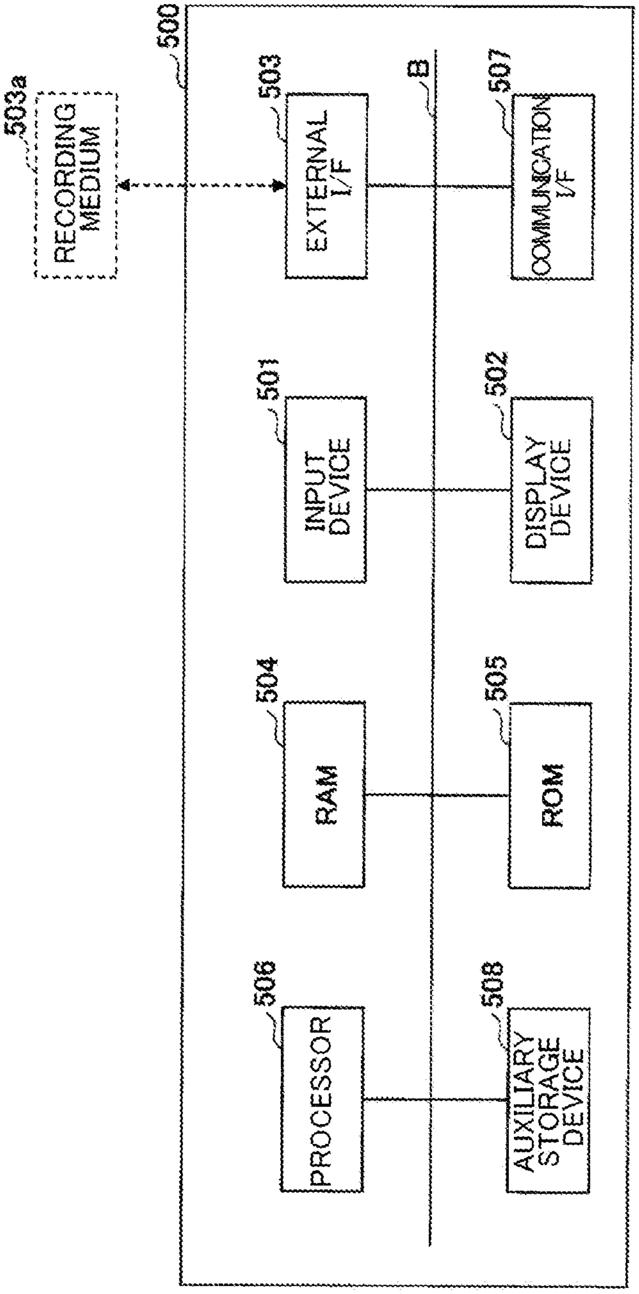
FIG. 11 is a diagram showing an example of a hardware configuration of a computer.

Next, hardware configurations of the labeling terminal 10, the speech output terminal 20, the label management server 30, and the Web server 40 included in the speech output system 1 according to the embodiment of the present invention will be described. These terminals and servers can be realized by using at least one computer 500. FIG. 11 is a diagram showing an example of a hardware configuration of the computer 500.

The computer 500 shown in FIG. 11 includes, as pieces of hardware, an input device 501, a display device 502, an external I/F 503, a RAM (Random Access Memory) 504, a ROM (Read Only Memory) 505, a processor 506, a communication I/F 507, and an auxiliary storage device 508. These pieces of hardware are communicably connected to each other via a bus B.

The input device 501 is, for example, a keyboard, a mouse, a touch panel, or the like. The display device 502 is, for example, a display or the like. Note that at least one of the input device 501 and the display device 502 may be omitted from the label management server 30 and/or the Web server 40.

The external I/F 503 is an interface with external devices. Examples of external devices include a recording medium 503*a*. The computer 500 can, for example, read and write data from and to the recording medium 503*a* via the external I/F 503.

The RAM 504 is a volatile semiconductor memory that temporarily holds programs and data. The ROM 505 is a non-volatile memory that can hold programs and data even when powered off. The ROM 505 stores, for example, setting information regarding an OS and setting information regarding the communication network N.

The processor 506 is, for example, a CPU (Central Processing Unit) or the like. The communication I/F 507 is an interface for connecting the computer 500 to the communication network N.

The auxiliary storage device 508 is, for example, an HDD (Hard Disk Drive) or an SSD (Solid State Drive), and is a non-volatile storage device that stores programs and data. Examples of the programs and data stored in the auxiliary storage device 508 include an OS, application programs that realize various functions on the OS, and so on.

Note that the speech output terminal 20 according to the embodiment of the present invention includes, in addition to the above-descried pieces of hardware, hardware for outputting speech (e.g. an I/F for connecting earphones or the like, a speaker, or the like).

The labeling terminal 10, the speech output terminal 20, the label management server 30, and the Web server 40 according to the embodiment of the present invention are realized by using the computer 500 shown in FIG. 11. Note that, as described above, the labeling terminal 10, the speech output terminal 20, the label management server 30, and the Web server 40 according to the embodiment of the present invention may be realized by using a plurality of computers 500. In addition, one computer 500 may include a plurality of processors 506 and a plurality of memories (RAMs 504, ROMs 505, auxiliary storage devices 508, and so on).

SUMMARY

As described above, with the speech output system 1 according to the embodiment of the present invention, it is possible to assign labels to substrings included in content by using a human computing technology, and thereafter output synthetic voices while switching between the voices according to the labels assigned to the substrings. As a result, with the speech output system 1 according to the embodiment of the present invention, it is possible to output the substrings in the content as speech, with voices that are similar to the voices that the user imagined.

Note that, in the embodiment of the present invention, the labeler and the user of the speech output terminal 20 are not necessarily the same person. That is to say, the user of label data regarding the labels assigned to the substrings in the content is not limited to the labeler. Also, the label data under the management of the label management server 30 may be sharable between a plurality of labelers. In such a case, for example, the label management server 30 or the like may provide the ranking of the labelers who have performed labeling, the ranking of the pieces of label data that have been used frequently, and the like. As a result, it is possible to contribute to keep the labelers motivated to perform labeling.

Also, for example, in the case of content such as Web pages, the same content may be divided into a plurality of Web pages and provided. In such a case, it is preferable that the assignment of voices is consistent in the Web pages. That is to say, if a certain novel is divided into a plurality of Web pages, utterances of the same character are read aloud in the same voice even on different Web pages. Therefore, in such a case, for example, the URLs of a plurality of Web pages may be settable in the data item "URL" of the speaker data shown in FIG. 7. Also, at this time, the speech output terminal 20 needs to hold the voice data regarding the voice in which the substrings to which the label data with the same speaker identification information is assigned are to be read aloud, in association with the identification information.

Also, although the embodiment of the present invention describes a case where each substring is read aloud in the voice corresponding to the attributes such as age and sex, there are various attributes that may cause a gap between the impression of utterances in the content and the impression of synthetic speech, in addition to age and sex.

For example, utterances of a person that is imagined as a calm person in a novel may be reproduced in a cheerful voice, or utterances in a sad scene may be reproduced in a joyful voice. Also, in novels or the like, a child character may grow up to be an adult as the story progresses, or conversely, in a flashback, an adult in a scene may appear as a child in a different scene. Therefore, in addition to age and sex, labels representing various attributes (e.g. a situation in a scene, the personality of a character, and so on) may be added to substrings, and each substring may be output as speech in the voice corresponding to the data of the label assigned thereto, for example. Also, the settings (e.g. the speed of speaking (Speech Rate), the pitch, and so on) of each voice may be changed according to the label.

The present invention is not limited to the above embodiment specifically disclosed, and may be variously modified or changed without departing from the scope of the claims.

REFERENCE SIGNS LIST

1 Speech output system
10 Labeling terminal
20 Speech output terminal
30 Label management server
40 Web server
110 Web browser
120 Add-on
121 Window output unit
122 Content analyzing unit
123 Label operation management unit
124 Label data transmission/reception unit
210 Speech output application
211 Content acquisition unit
212 Label data acquisition unit
213 Content analyzing unit
214 Content output unit
215 Speech management unit
216 Speech output unit
220 Voice data storage unit
310 Label management program
311 Label data transmission/reception unit
312 Label data management unit
313 DB management unit
314 Label data providing unit
320 Label management DB

The invention claimed is:

1. A speech output method carried out by a speech output system that includes a first terminal, a server, and a second terminal, wherein the first terminal carries out:

assigning, by a first label assigner, label data to character strings that are included in content, the label data representing attributes of speakers in a case where the character strings are to be read aloud by using synthetic speech; and transmitting, by a transmitter, the label data to the server, causing the server store the label data transmitted from the first terminal, in a database, in association with content identification information that identifies the content, and the second terminal carries out:

acquiring, by an acquirer, label data that corresponds to the content identification information regarding the content, from the server;

assigning, by a second label assigner, the acquired label data to the character strings included in the content;

specifying, by a specifier using pieces of label data that are respectively assigned to the character strings included in the content, for each of the character strings, a piece of speech data for synthetic speech to be used to read aloud the character string, from among a plurality of pieces of speech data; and providing, by a speech provider, outputting speech by reading aloud each of the character strings included in the content by using synthetic speech with the specified piece of speech data.

2. The speech output method according to claim 1, wherein the label data includes speaker identification information that identifies the speakers, and wherein, in the specifying, the same speech data is specified for character strings to which label data that includes the same speaker identification information is assigned.

3. The speech output method according to claim 1, wherein, in the storing, the label data is represented by using speaker data that represents the speakers and attributes of the speakers, and character string data that represents the character strings, and is stored in the database.

4. The speech output method according to claim 3, wherein the character string data includes a number of times a character string that is the same as the character string corresponding thereto has appeared in the content from the beginning of the content to the character string.

5. The speech output method according to claim 1, wherein the first label assigner assigns label data that represents attributes of a speaker selected by the user to a character string selected by a user from among the character strings included in the content.

6. The speech output method according to claim 1, wherein the attributes of speakers include at least a sex and an age of the speaker.

7. A speech output system that includes a first terminal, a server, and a second terminal, the first terminal comprising:

a first label assigner configured to assign label data to character strings that are included in content, the label data representing attributes of speakers in a case where the character strings are to be read aloud by using synthetic speech; and a transmitter configured to transmit the label data to the server, the server comprising: storing, by a storer, the label data transmitted from the first terminal, in a database, in association with content identification information that identifies the content, and the second terminal comprising:

an acquirer configured to acquire label data that corresponds to the content identification information regarding the content, from the server;

a second label assigner configured to assign the acquired label data to the character strings included in the content;

a specifier configured to, by using pieces of label data that are respectively assigned to the character strings included in the content, specify, for each of the character strings, a piece of speech data for synthetic speech to be used to read aloud the character string, from among a plurality of pieces of speech data; and a speech provider configured to provide speech by reading aloud each of the character strings included in the content by using synthetic speech with the specified piece of speech data.

8. A computer-readable non-transitory recording medium storing computer-executable program instructions that when executed by a processor cause a computer system to:

assign, by a first label assigner, label data to character strings that are included in content, the label data representing attributes of speakers in a case where the character strings are to be read aloud by using synthetic speech; and transmit, by a transmitter, the label data to the server, causing the server storing the label data transmitted from the first terminal, in a database, in association with content identification information that identifies the content, and the second terminal carries out:

acquire, by an acquirer, label data that corresponds to the content identification information regarding the content, from the server;

assign, by a second label assigner, the acquired label data to the character strings included in the content;

specify, by a specifier using pieces of label data that are respectively assigned to the character strings included in the content, for each of the character strings, a piece of speech data for synthetic speech to be used to read aloud the character string, from among a plurality of pieces of speech data; and providing, by a speech provider, outputting speech by reading aloud each of the character strings included in the content by using synthetic speech with the specified piece of speech data.

9. The speech output method according to claim 2, wherein, in saving, the label data is represented by using speaker data that represents the speakers and attributes of the speakers, and character string data that represents the character strings, and is stored in the database.

10. The speech output method according to claim 2, wherein the first label assigner assigns label data that represents attributes of a speaker selected by the user to a character string selected by a user from among the character strings included in the content.

11. The speech output method according to claim 2, wherein the attributes of speakers include at least a sex and an age of the speaker.

12. The speech output method according to claim 3, wherein the first label assigner assigns label data that represents attributes of a speaker selected by the user to a character string selected by a user from among the character strings included in the content.

13. The speech output method according to claim 3, wherein the attributes of speakers include at least a sex and an age of the speaker.

14. The speech output system according to claim 7, wherein the label data includes speaker identification information that identifies the speakers, and wherein the specifier specifies the same speech data for character strings to which label data that includes the same speaker identification information is assigned.

15. The speech output system according to claim 7, wherein the label data saved by a saver is represented by using speaker data that represents the speakers and attributes of the speakers, and character string data that represents the character strings, and is stored in the database.

16. The speech output system according to claim 7, wherein the first label assigner assigns label data that represents attributes of a speaker selected by the user to a character string selected by a user from among the character strings included in the content.

17. The speech output system according to claim 7, wherein the attributes of speakers include at least a sex and an age of the speaker.

18. The computer-readable non-transitory recording medium according to claim 8, wherein the label data includes speaker identification information that identifies the speakers, and wherein the specifier specifies the same speech data for character strings to which label data that includes the same speaker identification information is assigned.

19. The computer-readable non-transitory recording medium according to claim 8, wherein the label data stored by the server is represented by using speaker data that represents the speakers and attributes of the speakers, and character string data that represents the character strings, and is stored in the database.

20. The computer-readable non-transitory recording medium according to claim 19, wherein the character string data includes a number of times a character string that is the same as the character string corresponding thereto has appeared in the content from the beginning of the content to the character string.

* * * * *